US012615155B2

(12) United States Patent
Enkhtaivan et al.

(10) Patent No.: US 12,615,155 B2
(45) Date of Patent: **\*Apr. 28, 2026**

(54) SIGNATURE VERIFICATION SYSTEM, SIGNATURE VERIFICATION METHOD, AND PROGRAM

(71) Applicant: NEC Corporation, Tokyo (JP)

(72) Inventors: Batnyam Enkhtaivan, Tokyo (JP); Hiroto Tamiya, Tokyo (JP); Toshiyuki Isshiki, Tokyo (JP)

(73) Assignee: NEC Corporation, Tokyo (JP)

( \* ) Notice: Subject to any disclaimer, the term of this patent is extended or adjusted under 35 U.S.C. 154(b) by 154 days.

This patent is subject to a terminal disclaimer.

(21) Appl. No.: 17/928,227

(22) PCT Filed: Jun. 2, 2020

(86) PCT No.: PCT/JP2020/021824
§ 371 (c)(1),
(2) Date: Nov. 28, 2022

(87) PCT Pub. No.: WO2021/245806
PCT Pub. Date: Dec. 9, 2021

(65) Prior Publication Data
US 2023/0224164 A1 Jul. 13, 2023

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3236* (2013.01)

(58) Field of Classification Search
None
See application file for complete search history.

(56) References Cited

U.S. PATENT DOCUMENTS 5,963,649 A * 10/1999 Sako ..................... H04L 9/3221
713/180
2009/0138718 A1 5/2009 Chevallier-Mames
(Continued)

FOREIGN PATENT DOCUMENTS

JP 2010-050760 A 3/2010
WO 2019/057810 A1 3/2019

OTHER PUBLICATIONS

English translation of Written opinion for PCT Application No. PCT/JP2020/021824, mailed on Sep. 8, 2020.
(Continued)

*Primary Examiner* — Philip J Chea
*Assistant Examiner* — James Ross Hollister
(74) *Attorney, Agent, or Firm* — Sughrue Mion, PLLC

(57) ABSTRACT

A signature verification system 100 includes a signature apparatus 210 configured to sign data including a predetermined data block replaced with a chameleon hash value, using one or more public keys for changers authorized to change data, a changing apparatus 310 configured to receive the signed data, and to change a content of the predetermined data block of the signed data using a private key associated with any of the one or more public keys, and a verifying apparatus 410 configured to receive the signed data with the changed content of the predetermined data block, and to verify the signature using the one or more public keys for the changers.

7 Claims, 6 Drawing Sheets

(56) References Cited

U.S. PATENT DOCUMENTS

| 2009/0217042 | A1* | 8/2009 | Ramzan | H04L 9/3218 |
| | | | | 713/168 |
| 2009/0271631 | A1* | 10/2009 | Teranishi | H04L 9/3247 |
| | | | | 713/176 |
| 2010/0046749 | A1* | 2/2010 | Hatano | H04L 9/088 |
| | | | | 380/44 |
| 2011/0126020 | A1* | 5/2011 | Isshiki | H04N 21/6125 |
| | | | | 713/176 |
| 2017/0374033 | A1* | 12/2017 | Kovacs | H04L 9/3263 |
| 2020/0265141 | A1 | 8/2020 | Díaz et al. | |

OTHER PUBLICATIONS

International Search Report for PCT Application No. PCT/JP2020/021824, mailed on Sep. 8, 2020.
Written opinion for PCT Application No. PCT/JP2020/021824, mailed on Sep. 8, 2020.
C. Brzuska, M. Fischlin, A. Lehmann, and D. Schroder, "Unlinkability of Sanitizable Signatures", In: Nguyen, p. Q., Pointcheval, D. (eds.) PKC 2010. LNCS, vol. 6056, pp. 444-461. Springer, Heidelberg (2010).

* cited by examiner

1

SIGNATURE VERIFICATION SYSTEM, SIGNATURE VERIFICATION METHOD, AND PROGRAM

This application is a National Stage Entry of PCT/JP2020/021824 filed on Jun. 2, 2020, the contents of all of which are incorporated herein by reference, in their entirety.

TECHNICAL FIELD

The present invention relates to a signature verification system, a signature verification method, and a program.

BACKGROUND ART

Recent improvements in performance of artificial intelligence (AI) analysis have increased the value of data subject to analysis. This has led to a study of a mechanism in which an individual provides his/her own data to a company desiring to have the data and accepts compensation for the data. As such a mechanism, personal data trust banks, which manage and operate data of individuals, have attracted attention.

In the personal data trust bank mechanism, first, a personal data provider creates data related to an individual and signs the data. The signed data is provided to the individual. The individual having received the signed data deposits the signed data in the personal data trust bank. The personal data trust bank provides the signed data thus deposited, to a personal data user.

The signing by the personal data provider is performed to identify the source of the data and maintain reliability of the data. Hence, when the data is changed, verification of the signature fails. However, it is desired in some cases to change part of the data without losing the validity of the signature. For example, in a case of providing physical examination data of an individual to a personal data user, there may be a case where part of the physical examination data is desired to be hidden.

Specifically, there may be, for example, a case of allowing data of weight to be provided while not desiring to provide data of blood type in the physical examination data.

As described above, in a case where a personal data trust bank provides, to a personal data user, data deposited by an individual, it is desired that part of the data can be changed by the personal data trust bank without losing the validity of a signature and that, when the individual uses a plurality of personal data trust banks, the data can be changed by any of the personal data trust banks.

PTL 1 discloses an electronic signature technique that enables data editing by a plurality of changers with a single private key for editing being prepared.

NPL 1 discloses a technique in which a changer uses a private key for each of members of a group including a signer and a plurality of changers, the private key being created in accordance with a group signature scheme, to enable the plurality of changers to be designated and enable data change by the changers.

CITATION LIST

Patent Literature

[PTL 1] JP 2010-050760 A

Non Patent Literature

[NPL 1] C. Brzuska, M. Fischlin, A. Lehmann, and D. Schroder, "Unlinkability of Sanitizable Signatures", In:

2

Nguyen, P. Q., Pointcheval, D. (eds.) PKC 2010. LNCS, vol. 6056, pp. 444-461. Springer, Heidelberg (2010)

SUMMARY

Technical Problem

However, to enable data editing by the plurality of changers in the technique described in PTL 1, it is necessary to communicate with the members of the group and register the members in advance.

In the technique described in NPL 1, a group key is needed for each combination of the signer and changers. Hence, in a case of applying this technique to personal data trust banks, each of a personal data provider and the personal data trust banks needs to manage group keys the number of which corresponds to the number of groups to which the personal data provider or the personal data trust bank belongs. Moreover, every time data is changed, computation processing requiring a computation amount equivalent to that of signature generation is needed.

An example object of the present invention is to provide a signature verification system, a signature generation apparatus, a signature verification method, and a program that facilitate management of keys and enable designation of a plurality of changers for data with less computation cost.

Solution to Problem

A signature verification system according to one example aspect of the present invention includes: a signature apparatus configured to sign data including a predetermined data block replaced with a chameleon hash value, using one or more public keys for changers authorized to change data; a changing apparatus configured to receive the signed data, and to change a content of the predetermined data block of the signed data using a private key associated with any of the one or more public keys; and a verifying apparatus configured to receive the signed data with the changed content of the predetermined data block, and to verify the signature using the one or more public keys for the changers.

A signature verification method according to one example aspect of the present invention includes: a signature step of signing data including a predetermined data block replaced with a chameleon hash value, using one or more public keys for changers authorized to change data; a changing step of receiving the signed data, and changing a content of the predetermined data block of the signed data using a private key associated with any of the one or more public keys; and a verifying step of receiving the signed data with the changed content of the predetermined data block, and verifying the signature using the one or more public keys for the changers.

A program according to one example aspect of the present invention causes a computer to execute the signature verification method.

Advantageous Effects of Invention

According to the present invention, it is possible to facilitate management of keys and enable a plurality of changers to be designated for data with less computation cost.

DESCRIPTION OF THE EXAMPLE EMBODIMENTS

Hereinafter, example embodiments of the present invention will be described with reference to the drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. First Example Embodiment
    2.1. System Configuration
    2.2. Operation Example
    2.3. Concrete Example 1
    2.4. Concrete Example 2
    2.5. Concrete Example 3
    2.6. Hardware Configuration
    2.7. Description of Effects
3. Second Example Embodiment
    3.1. System Configuration
    3.2. Operation Example
    3.3. Description of Effects
4. Other Example Embodiments <<1. Overview of Example Embodiments of the Present Invention>>

Figure 1:
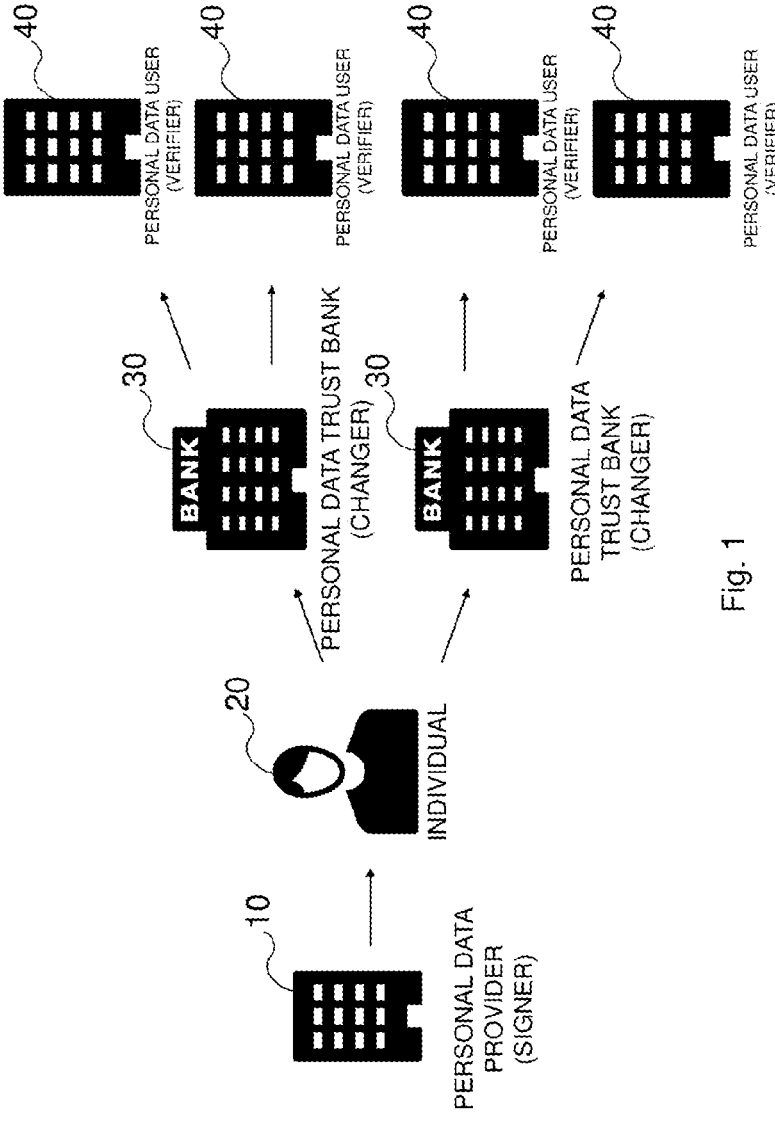
FIG. 1 is a diagram describing an overview of example embodiments of the present invention.

FIG. 1 is a diagram describing an overview of example embodiments of the present invention. The example embodiments of the present invention will be described based on a system including personal data trust banks that manage and operate data of an individual as described above.

As illustrated in FIG. 1, a system according to one example embodiment of the present invention includes a personal data provider 10, an individual 20, personal data trust banks 30, and personal data users 40.

The personal data provider 10 generates data related to the individual 20, signs the generated data, and provides the signed data to the individual 20. The personal data provider 10 may be a signer of data in the example embodiments of the present invention.

The individual 20 provides the signed data thus received, to the personal data trust banks 30. Note that the signed data may be provided from the personal data provider 10 directly to the personal data trust banks 30 without the intervention of the individual 20.

Each of the personal data trust banks 30 can change a content of the signed data, and newly signs data obtained through the changing and provides the data to a relevant one(s) of the personal data users 40. The personal data trust bank 30 can change the data on the basis of an indication from the individual 20, for example. The personal data trust bank 30 may be a changer of data in the example embodiments of the present invention.

Each of the personal data users 40 verifies the signature of the signed data received from the personal data trust bank 30. When the verification succeeds, the personal data user 40 uses the data. The personal data user 40 may be a verifier of data in the example embodiments of the present invention.

According to the example embodiments of the present invention, it is possible in such a system to facilitate management of keys and enable designation of a plurality of data changers with less computation cost. Note that the number of personal data providers 10, the number of individuals 20, the number of personal data trust banks 30, and the number of personal data users 40 are not limited to the numbers illustrated in FIG. 1.

In the example embodiments of the present invention, as a so-called sanitizable signature, an electronic signature for which a changer (personal data trust bank 30) can change a predetermined part of a message (data) without losing the validity of a signature created by an original signer (personal data provider 10).

The sanitizable signature according to the example embodiments of the present invention is provided using a chameleon hash. A normal hash function (a hash function that is not a chameleon hash) has characteristics of compressing an input message to a value (hash value) of a predetermined bit length and not generating the same hash value unless an identical message is input. Specifically, assume that messages are denoted by m and m' and the hash function is denoted by H( ) In a case where m #m', H(m)≠H(m'). The characteristics are called collision resistance. The normal hash function also has characteristics that no collision can be found based on a hash value. Specifically, m' satisfying H (m') cannot be obtained based on m and H(m). Note that m≠m'. The characteristics are called second preimage resistance. In contrast, a chameleon hash is a hash function with which a collision can be found when a certain private key is known.

In the sanitizable signature, the message m is divided into a plurality of blocks as presented in Expression (1) below.

[Math. 1]

$$m = (m_1, \ldots , m_t) \tag{1}$$

Here, the message is divided into t blocks.

A part permitted to be changed among the plurality of blocks is replaced with a chameleon hash value. For example, assume that the part permitted to be changed is denoted by $m_1$ and the chameleon hash function is denoted by CH( ) Then, a signer signs a message ($m_1$, . . . , CH($m_i$), . . . , $m_t$) including a part replaced with the chameleon hash value. The part represented by CH($m_i$) denoting the chameleon hash value corresponds to the part permitted to be changed. This part is a part that can be changed even after signing.

In the example embodiments of the present invention, processes including key generation, signing, change, and verification are performed, and a plurality of changers (sanitizers) can be designated for a single change-permitted block, as presented in the following table. Details of each of the processes will be described with reference to concrete examples.

TABLE 1

Key generation: $(pk_{sig}, sk_{sig}), (pk_{san}, sk_{san}) \xleftarrow{R} KeyGen(1^k)$ Signing: $\sigma \leftarrow SIGN(m, sk_{sig}, pk_{san_1}, pk_{san_2}, \ldots, pk_{san_x}, ADM)$
Change: $(m', \sigma') \leftarrow SANIT(m, MOD, \sigma, pk_{sia}, sk_{san})$
Verification: (true, false) $\leftarrow$ VERIFY
$(m', \sigma' \ pk_{sig}, pk_{san_2}, pk_{san_2}, \ldots pk_{sanx})$

---

Here, one or more public keys $pk_{san1}, pk_{san2}, \ldots, pk_{sann}$ to be used for a signature are used to designate one or more changers. To verify a changed message, any of the one or more public keys $pk_{san1}, pk_{san2}, \ldots, pk_{sann}$ is used to perform the verification. In addition, $ADM=(t, L_{ADM})$. t denotes the number of divisions, and $L_{ADM}$ denotes a list of changeable blocks.

As described above, an example object of the example embodiments of the present invention is to provide a chameleon hash based sanitizable signature that facilitates management of keys and enables designation of a plurality of changers for data with less computation cost.

2. First Example Embodiment

<2.1. System Configuration>

Figure 2:
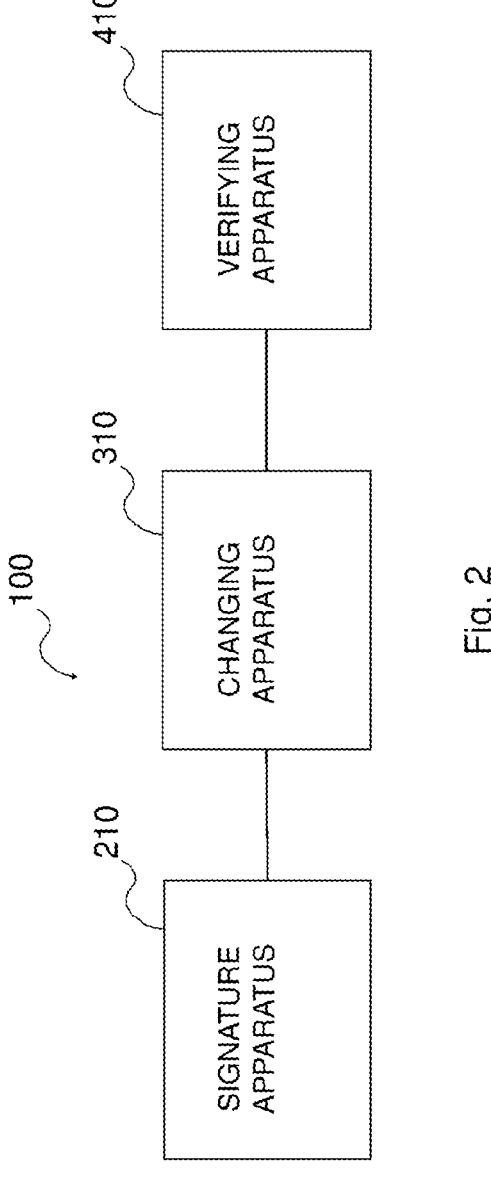
FIG. 2 is a block diagram illustrating an example of a configuration of a signature verification system according to a first example embodiment.

FIG. 2 is a block diagram illustrating an example of a configuration of a signature verification system according to a first example embodiment. A signature verification system 100 includes a signature apparatus 210, a changing apparatus 310, and a verifying apparatus 410. Each of constituent elements of the signature verification system 100 will be described below. Note that a constituent element corresponding to the individual 20 illustrated in FIG. 1 is not essential to describe the present example embodiment, and hence a description of the constituent element is omitted.

Figure 3:
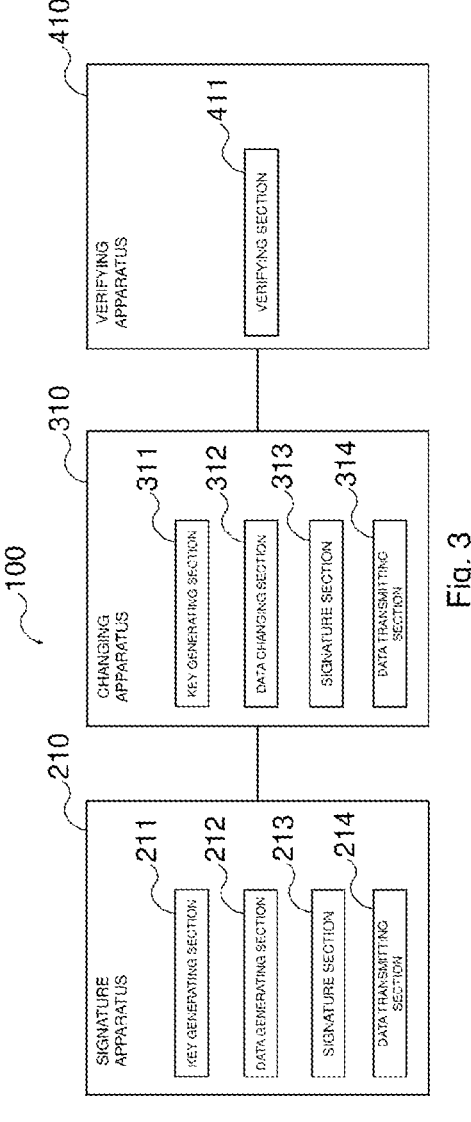
FIG. 3 is a functional block diagram illustrating an example of a concrete configuration of the signature verification system according to the first example embodiment.

FIG. 3 is a functional block diagram illustrating an example of a concrete configuration of the signature verification system according to the first example embodiment.

The signature apparatus 210 includes a key generating section 211, a data generating section 212, a signature section 213, and a data transmitting section 214. The signature apparatus 210 corresponds to an apparatus used by the personal data provider 10 described above. The key generating section 211 generates a signature key pair (a pair of a public key $pk_{sig}$ and a private key $sk_{sig}$). The data generating section 212 generates target data. The data includes a plurality of data blocks and includes a predetermined data block permitted to be changed replaced with a chameleon hash value. The signature section 213 signs the generated data, using one or more public keys for changers authorized to change data. The data transmitting section 214 transmits the signed data to the changing apparatus 310.

The changing apparatus 310 includes a key generating section 311, a data changing section 312, a signature section 313, and a data transmitting section 314. The changing apparatus 310 corresponds to an apparatus used by each of the personal data trust banks 30 described above. The key generating section 311 generates a public key pair (a pair of a public key $pk_{san}$ and a private key $sk_{san}$). The data changing section 312 changes a content of the signed data including the predetermined data block replaced with the chameleon hash value. The predetermined data block is a part permitted to be changed of the data. The data includes the predetermined data block and a data block(s) not permitted to be changed. The data can be changed when the private key corresponding to any of the public key for the changers authorized to change the data is held. The signature section 313 signs the changed data. The data transmitting section 314 transmits the signed data after the change, to the verifying apparatus 410.

The verifying apparatus 410 includes a verifying section 411. The verifying apparatus 410 corresponds to an apparatus used by any of the personal data users 40 described above. The verifying section 411 verifies the signature of the signed data after the change, using the public key associated with the private key for the signature. When the verification succeeds, the personal data user 40 can use the data for which the verification succeeds, for a desired purpose.

Each of the processing sections of the apparatuses described above is implemented with a central processing unit (CPU) of a computer configured to operate according to a program and a communication interface of the computer, for example. For example, the CPU reads the program from a program recording medium, such as a program storage apparatus of the computer, and uses, as necessary, the communication interface to operate as each of the processing sections of the apparatuses described above according to the program.

<2.2. Operation Example>

Next, an operation example according to the first example embodiment will be described.

Figure 4:
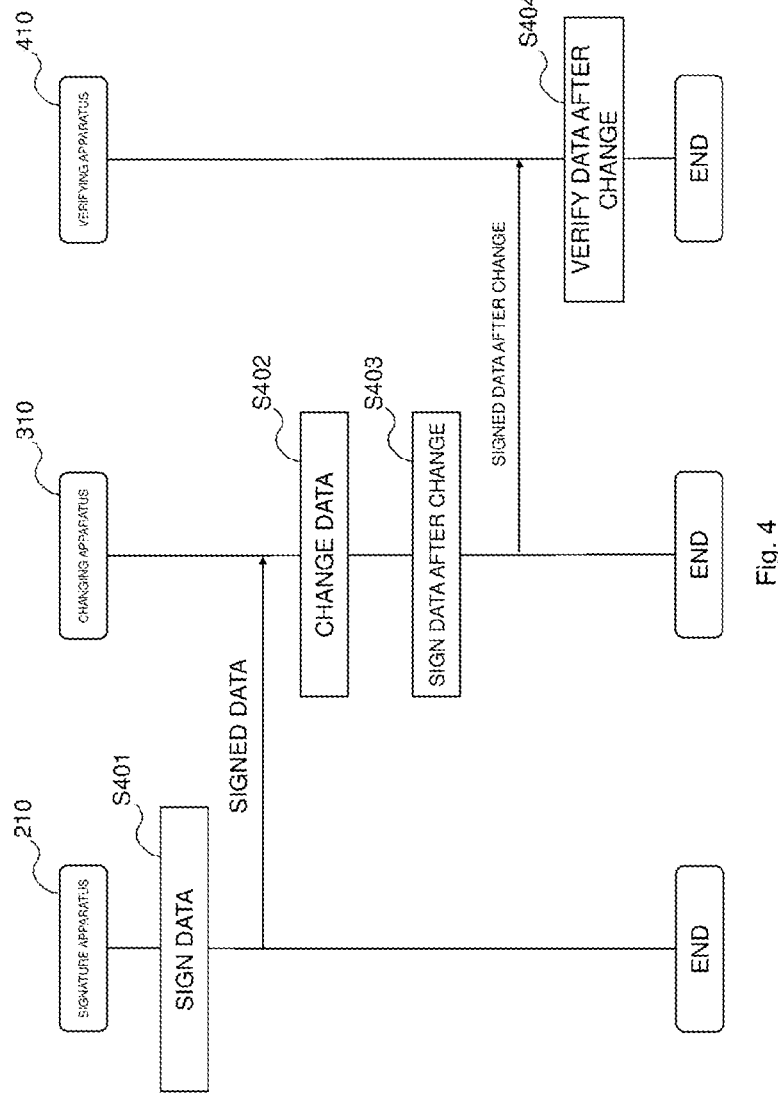
FIG. 4 is a sequence diagram of signature verification processing according to the first example embodiment.

FIG. 4 is a sequence diagram of signature verification processing according to the first example embodiment. Note that detailed descriptions of what have already been described are omitted.

First, in step S401, the signature apparatus 210 signs data including a predetermined data block replaced with a chameleon hash value, using a private key for a signature and one or more public keys for data change. The signed data is provided to the changing apparatus 310.

Next, in step S402, the changing apparatus 310 changes a content of the predetermined data block permitted to be changed of the signed data. The data can be changed when the changing apparatus 310 has the private key associated with the public key for data change. Thereafter, in step S403, the changing apparatus 310 signs the data after the change. The signed data after the change is provided to the verifying apparatus 410.

Then, in step S404, the verifying apparatus 410 verifies the signed data after the change, using the public key associated with the private key for the signature.

The signature verification processing according to the present example embodiment is performed as described above.

<2.3. Concrete Example 1>

A description will be given below of the signature verification processing according to the present example embodiment, i.e., concrete example 1 of the processes including key generation, signing, change, and verification presented in Table 1 above.

First, key generation processing by the signature apparatus 210 and the changing apparatus 310 is performed in the procedure presented in the following table.

TABLE 2

Cause a key generation algorithm of a standard signature scheme to operate, to generate a key pair.

Key generation: $\left(pk_{sig}, sk_{sig}\right), (pk_{san}, sk_{san}) \xleftarrow{R} KeyGen(1^k)$ Choose $x_{sig}, x_{san} \xleftarrow{R} Z_q^*$ for prime numbers $p$ and $q$ TABLE 2-continued where p = uq + 1 and a generator g ∈ $Z_p^*$ with an order q, and
    calculate $y_{sig} = g^{x_{sig}}$mod p, $y_{san} = g^{x_{san}}$mod p.
    Then, determine ($pk_{sig}$, $sk_{sig}$) = ($y_{sig}$, $x_{sig}$), $pk_{san}$, $sk_{san}$) = ($y_{san}$, $x_{san}$).

Subsequently, signing processing by the signature apparatus 210 is performed in the procedure presented in the following table.

TABLE 3

Signing: σ ← SIGN (m, $sk_{sig}$, $pk_{san_1}$, $pk_{san_2}$, . . . , $pk_{san_n}$, ADM(= t, $L_{ADM}$))
1. Randomly generate a unique ID $ID_m$ for each message 2. $\overset{\cdots}{m_i} = \begin{cases} m_i & \text{if } i \notin ADM, L_{ADM} \\ \rho_i - \left(\left(y_{ls_i}^{e_i} g^{\delta_i} \bmod p\right) \bmod q\right) & \text{if } i \in ADM, L_{ADM} \end{cases}$ TABLE 3-continued Here, $e_i$ = H($m_i$, $\rho_i$, $is_i$), where H denotes a hush function having collision resistance, and $is_i$ = sig
3. By using a signature algorithm of a standard signature scheme,
    δ ← $\text{Sign}_{sk_s}$ ($ID_m$||t||$y_{san_1}$ ||$y_{san_2}$|| . . . ||$y_{san_n}$||$\bar{m}_1$||$\bar{m}_2$|| . . . $\bar{m}_t$)
4. σ = (∂, $\{\rho_i\}_{i \in ADM, L_{ADM}}$, $\{\delta_i\}_{i \in ADM, L_{ADM}}$, $\{ls_i\}_{i \in ADM, L_{ADM}}$)

Here, Isi denotes data of a changer who has changed an i-th block last. At the time of signing, $ls_i$ corresponds to a signer (sig).

Subsequently, change processing by the changing apparatus 310 is performed in the procedure presented in the following table. In concrete example 1, the changing apparatus 310 having a private key for data change ($x_j$ in 1.5 below) can change data. All changing apparatuses 310 each having the private key for data change can change a content of a predetermined data block permitted to be changed.

TABLE 4

Change: (m', σ') ← SANIT (m, MOD = {(i, $m_i'$)}, σ, $pk_{sig}$, $sk_{san_j}$)
1. For each i designated for MOD 1. $k' \overset{R}{\leftarrow} \mathbb{Z}_q^*$ 2. $\overset{\cdots}{m_i} = \begin{cases} m_i & \text{if } i \notin ADM, L_{ADM} \\ \rho_i - \left(\left(y_{ls}^{e_i} g^{\delta_i} \bmod p\right) \bmod q\right) & \text{if } i \in ADM, L_{ADM} \end{cases}$ , $e_i$ = H($m_i$, $\rho_i$, $ls_i$)

3. $\rho_i'$ = $\bar{m}_j$ + ($g^{k'}$ mod p) mod q
  4. $e_i'$ = H($m_i'$, $\rho_i'$)
  5. $\delta_i'$ = k' − $e_i'x_j$
  6. $ls_i'$ = $san_j$
2. σ' = (∂, $\{\rho_i'\}_{i \in ADM, L_{ADM}}$, $\{\delta_i'\}_{i \in ADM, L_{ADM}}$, $\{ls_i'\}_{i \in ADM, L_{ADM}}$),
    where, for i not designated for MOD, $\rho_i'$ = $\rho_i$, $∂_i'$ = $δ_i$, $ls_i'$ = $ls_i$ Subsequently, verification processing by the verifying apparatus 410 is performed in the procedure presented in the following table.

TABLE 5

Verification: d ∈ {True, False} ← VERIFY(m, σ, $pk_{sig}$, $pk_{san_1}$, $pk_{san_2}$, . . . , $pk_{san_n}$)

1. $\overset{\cdots}{m_i} = \begin{cases} m_i & \text{if } i \notin ADM, L_{ADM} \\ \rho_i - \left(\left(y_{ls}^{e_i} g^{\delta_i} \bmod p\right) \bmod q\right) & \text{if } i \in ADM, L_{ADM} \end{cases}$ , $e_i$ = H($m_i$, $\rho_i$, $ls_i$)

2. d ← $\text{Verify}_{pk_{sig}}$ ($ID_m$||t||$y_{san_1}$ ||$y_{san_2}$|| . . . ||$y_{san_n}$||$\bar{m}_1$||$\bar{m}_2$|| . . . $\bar{m}_t$)

As described above, in concrete example 1, the processes including key generation, signing, change, and verification are performed.

<2.4. Concrete Example 2>

Next, concrete example 2 will be described. In concrete example 2, in comparison with concrete example 1, a different chameleon hash is used, and a public key for changers is used to generate a hash value. Note that descriptions of similar kinds of processing to those of concrete example 1 above will be omitted.

In concrete example 2, a chameleon hash expressed by Expression (2) below is used.

[Math. 2]

$$CH_y(m, r) = g^r y^m \qquad (2)$$

Here, y denotes a public key for changers, and $y=g^x$ mod p. x denotes a private key for the changers. To change message m to m', it is only needed to obtain r' satisfying $xm+r=xm'+r'$ mod q. However, since m, m', r, and r' are made public, using this form without change allows the private key x to be calculated easily. This is called a key exposure problem. To address this problem, the following two variations may be used. In the following, part corresponding to mod is omitted for simplicity.

In concrete example 2, as presented in Expression (3) below, a changer may use both public key change and a Schnorr signature at every change. Here, the Schnorr signature has the role of indicating that the changer knows a private key for a new public key.

[Math. 3]

$$CH_{pk_1,pk_2,\dots,pk_n}(m, r) = g^r pk_1^m pk_2^m \dots pk_n^m = \tag{3}$$
$$g^{r'} pk_1^m pk_2^m \dots z_j^{m'} \dots pk_n^m = CH_{pk_1,\dots,pk_j \to z_j,\dots,pk_n}(m \to m', r')$$

Here, $\{m_i'\}$ is the same as $\{m_i\}$ except for a changed part.

Alternatively, as presented in Expression (4) below, a double trap door may be used.

[Math. 4]

$$CH_{pk_1 pk_1', pk_2 pk_2', \dots, pk_n pk_n'}(m, r, s) = \tag{4}$$
$$g^r pk_1^m pk_1'^s \dots pk_n^m pk_n'^s = g^{r'} pk_1^m pk_1'^s \dots pk_j^{m'} pk_j'^{s'} \dots pk_n^m pk_n'^s =$$
$$CH_{pk_1 pk_1', \dots, pk_j pk_j', \dots, pk_n pk_n'}(m \to m', r \to r', s \to s')$$

In a case of Expression (3), signing is performed as presented in the following table.

TABLE 6-1

Signing: $\sigma = \text{SIGN}(m, r; sk_{sig}, pk_1, pk_2, \dots, pk_n, \text{ADM}(= \{t, L_{ADM}\}))$ $$\overline{m_i} = \begin{cases} m_i & \text{if } i \notin ADM.L_{ADM} \\ CH_{pk_1 \dots pk_n}(m_i, r_i) & \text{if } i \in ADM.L_{ADM} \end{cases}$$

$\overline{\sigma} \leftarrow S_{sk_{sign}}(ID_m||t||pk_1 \dots ||pk_n||\overline{m_1}|| \dots ||\overline{m_r})$
$\sigma = (\overline{\sigma}, \{\overline{r_i}\}_{i \in ADM.L_{ADM}}, \{ls_i\}_{i \in ADM.L_{ADM}})$ In a case of Expression (4), signing is performed as presented in the following table.

TABLE 6-2

Signing: $\sigma = \text{SIGN}(m, r, s; sk_{sig}, pk_1, pk_1', \dots, pk_n, pk_n', \text{ADM}(= \{t, L_{ADM}\}))$ $$\overline{m_i} = \begin{cases} m_i & \text{if } i \notin ADM.L_{ADM} \\ CH_{pk_1 pk_1' \dots, pk_n pk_n'}(m_i, r_i, s_i) & \text{if } i \in ADM.L_{ADM} \end{cases}$$

$\overline{\sigma} \leftarrow S_{sk_{sign}}(ID_m||t||pk_1|| pk_1' \dots ||pk_n||pk_n'||\overline{m_1}|| \dots ||\overline{m_r})$
$\sigma = (\overline{\sigma}, \{\overline{r_i}\}_{i \in ADM.L_{ADM}}, \{s_j\}_{i \in ADM.L_{ADM}}, \{ls_i\}_{i \in ADM.L_{ADM}})$ In the case of Expression (3), change of data is performed as presented in the following table.

TABLE 7-1

Change: $(m', \sigma') \leftarrow \text{SANIT}(m, \text{MOD} = \{(i, m_i')\}, \sigma, sk_{san_j}, sk'_{san_j})$
For each i designated for MOD,
Calculate $r_i'$ satisfying $sk_{san_j}m_i + r_i = sk'_{san_j}m_i' + r_i'$,
Here, $sk'_{san_j}$ denotes a new private key for $san_j$
$\sigma' = (\overline{\sigma}, \{\overline{r_i'}\}_{i \in ADM.L_{ADM}}, \{ls_i'\}_{i \in ADM.L_{ADM}}, \text{MOD}, pk'_{san_j}, \sigma_{schnorr})$
where
for i not designated for MOD, $r_i' = r_i$, $ls_i' = ls_i$ and
$\sigma_{schnorr}$ is a signature for MOD that can be verified using $z_j = g^{sk'san_j}$ In the case of Expression (4), change of data is performed as presented in the following table.

TABLE 7-2

Change: $(m', \sigma') \leftarrow \text{SANIT}(m, \text{MOD} = \{(l, m_i')\}, \sigma, sk_{san_j}, sk'_{san_j})$
For each i designated for MOD, randomly choose $s_i'$ and
Calculate $r_i'$ satisfying $sk_{san_j}m_i + sk'_{san_j}s_i + r_i = sk_{san_j}m_i' + sk'_{san_j}s_i' + r_i'$.
Here, $sk'_{san_j}$ denotes a private key corresponding to $pk'_{san_j}$.
$\sigma' = (\overline{\sigma}, \{\overline{r_i'}\}_{i \in ADM.L_{ADM}}, \{s_i'\}_{i \in ADM.L_{ADM}}, \{ls_i'\}_{i \in ADM.L_{ADM}}, \text{MOD})$
where
for i not designated for MOD, $r_i' = r_i$, $ls_i' = ls_i$ Subsequently, in the case of Expression (3), the verification processing by the verifying apparatus 410 is performed in the procedure presented in the following table.

TABLE 8-1

Verification: $d \in \{\text{True, False}\} \leftarrow \text{VERIFY}(m, \sigma, pk_{sig}, pk_{san_1}, pk_{san_2}, \ldots, pk_{san_n})$ 1.
$$\tilde{m}_t = \begin{cases} m_i & \text{if } i \notin ADM.L_{ADM} \\ g^{r'} \, pk_{san_1}^{m_i} pk_{san_2}^{m_i} \, \ldots \, pk_{san_j}^{m'_j} \, \ldots \, pk_n^{m_i} & \text{if } i \in ADM.L_{ADM} \end{cases}$$

2. $d \leftarrow \text{Verify}_{pk_{sig}}(ID_m ||t|| pk_{san_1} || pk_{san_2} \cdots || pk_{san_n} || \tilde{m}_1 || \tilde{m}_2 \cdots || \tilde{m}_t)$ In the case of Expression (4), the verification processing is performed as presented in the following table.

TABLE 8-2

Verification: $d \in \{\text{True, False}\} \leftarrow \text{VERIFY}(m, \sigma, pk_{sig}, pk_{san_1}, pk_{san_1}', \ldots, pk_{san_n}, pk_{san_n}')$ 1.
$$\tilde{m}_t = \begin{cases} m_i & \text{if } i \notin ADM.L_{ADM} \\ g^{r'} \, pk_{san_1}^{m_i} pk_{san_1}'^{s_i} \, \ldots \, pk_{san_j}^{m'_i} pk_{san_j}'^{s'_i} \, \ldots \, pk_{san_n}^{m_i} pk_{san_n}'^{s_i} & \text{if } i \in ADM.L_{ADM} \end{cases}$$

2. $d \leftarrow \text{Verify}_{pk_{sig}}(ID_m ||t|| pk_{san_1} || pk_{san_1}' \cdots || pk_{san_n} || pk_{san_n}' || \tilde{m}_1 || \tilde{m}_2 \cdots || \tilde{m}_t)$ In concrete example 2, verification of a signature is performed by using both the message m before change and the message m' after change, which consequently leaves a history of changing of the message.

<2.5. Concrete Example 3>

Next, concrete example 3 will be described. In concrete example 3, in comparison with concrete example 2, a different chameleon hash is used. Note that descriptions of similar processing to that of concrete example 1 and concrete example 2 above will be omitted.

In concrete example 3, a chameleon hash expressed by Expression (5) below is used. In the chameleon hash expressed by Expression (5), in comparison with the chameleon hash expressed by Expression (2) of concrete example 2, r and m of the right side are changed places.

$$CH_{pk}(m, r) = g^m pk^r \tag{5}$$

In concrete example 3, as presented in Expression (6) below, both public key changing and a Schnorr signature may be used every time.

[Math. 6]

$$CH_{pk_1, pk_2, \ldots, pk_n}(m, r) = g^m pk_1^r pk_2^r \, \ldots \, pk_n^r =$$
$$g^{m'} pk_1^r pk_2^r \, \ldots \, pk_j'^r \, \ldots \, pk_n^r = CH_{pk_1, \ldots, pk_j \to pk_j', \ldots, pk_n}(m', r \to r') \tag{6}$$

Alternatively, as presented in Expression (7) below, a double trap door may be used.

[Math. 7]

$$CH_{pk_1 pk_1', pk_2 pk_2', \ldots, pk_n pk_n'}(m, r, s) = \tag{7}$$
$$g^m pk_1^r pk_1'^s \, \ldots \, pk_n^r pk_n'^s = g^{m'} pk_1^r pk_1'^s \, \ldots \, pk_j'^r pk_j'^{s'} \, \ldots \, pk_n^r pk_n'^s =$$
$$CH_{pk_1 pk_1', \ldots, pk_j pk_j', \ldots, pk_n pk_n'}(m', r \to r', s \to s')$$

In concrete example 3, different from concrete example 2, verification of a signature is performed by using the message m' after change without using the message m before change, which does not consequently leave a history of change of the message.

<2.6. Hardware Configuration>

Figure 5:
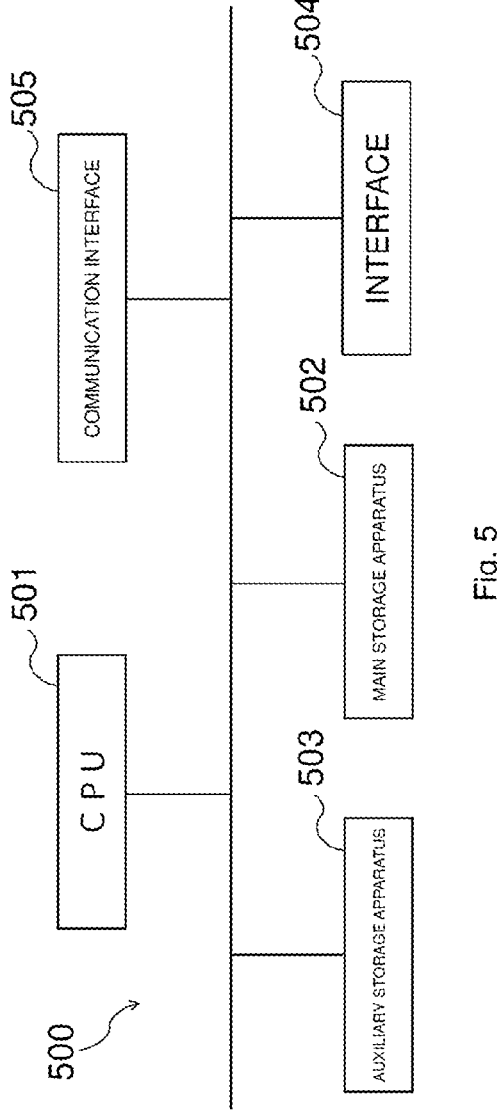
FIG. 5 is a schematic block diagram illustrating an example of a hardware configuration of a computer according to the first example embodiment.

FIG. 5 is a schematic block diagram illustrating an example of a hardware configuration of a computer according to the present example embodiment. The computer illustrated in FIG. 5 may operate as each of the apparatuses configuring the signature verification system according to the present example embodiment.

A computer 500 includes a CPU 501, a main storage apparatus 502, an auxiliary storage apparatus 503, an interface 504, and a communication interface 505.

Operations of the computer 500 are stored in the auxiliary storage apparatus 503 in a form of program. The CPU 501 reads the program from the auxiliary storage apparatus 503 and develops the program to the main storage apparatus 502, and performs, according to the program, operations of each of the apparatuses described in the present example embodiment.

The auxiliary storage apparatus 503 is an example of a non-transitory tangible medium. Other examples of the non-transitory tangible medium include a magnetic disk, a magneto-optical disk, a compact disk read only memory (CD-ROM), a digital versatile disk read only memory (DVD-ROM), and a semiconductor memory connected via the interface 504. When the program is distributed to the computer 500 through a communication line, the computer 500 that has received the distribution may develop the program to the main storage apparatus 502 and operate according to the program.

Part or all of the constituent elements of each of the apparatuses may be implemented with general-purpose or dedicated circuitry, processor, or the like, or a combination of these. These may be configured of a single chip or may be configured of a plurality of chips connected via a bus. Part or all of the constituent elements may be implemented with a combination of the circuitry or the like and the program described above.

<2.7. Description of Effects>

According to the present example embodiment, it is possible to provide a signature verification system, a signature generation apparatus, a signature verification method, and a program that facilitate management of keys and enable designation of a plurality of changers for data with less computation cost.

3. Second Example Embodiment

Next, a description will be given of a second example embodiment of the present invention with reference to FIG. 6. The above-described first example embodiment is a concrete example embodiment, whereas the second example embodiment is a more generalized example embodiment.

<3.1. System Configuration>

Figure 6:
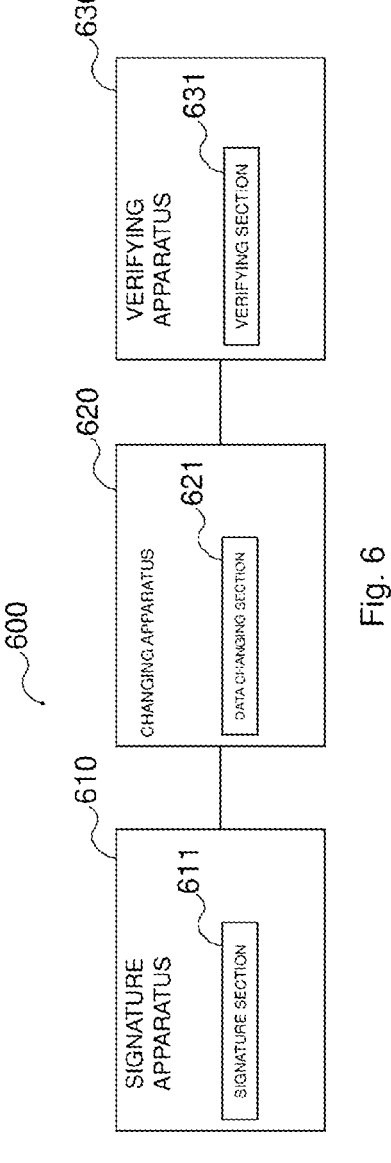
FIG. 6 is a functional block diagram illustrating an example of a concrete configuration of a signature verification system according to a second example embodiment.

FIG. 6 is a functional block diagram illustrating an example of a concrete configuration of a signature verification system according to the second example embodiment. A signature verification system 600 according to the present example embodiment includes a signature apparatus 610, a changing apparatus 620, and a verifying apparatus 630. Note that the number of signature apparatuses 610, the number of changing apparatuses 620, and the number of verifying apparatuses 630 are not limited to the numbers illustrated in FIG. 6. The signature apparatus 610, the changing apparatus 620, and the verifying apparatus 630 may be connected to each other via a communication network.

The signature apparatus 610 includes a signature section 611. The signature section 611 signs data including a predetermined data block replaced with a chameleon hash value, using one or more public keys for changers authorized to change data.

The changing apparatus 620 includes a data changing section 621. The data changing section 621 receives the signed data and changes a content of the predetermined data block of the signed data, using a private key associated with any of the one or more public keys.

The verifying apparatus 630 includes a verifying section 631. The verifying section 631 receives the signed data with the changed content of the predetermined data block and verifies the signature, using the one or more public keys for the changers.

Each of the processing sections of the apparatuses described above is implemented with a central processing unit (CPU) of a computer configured to operate according to a program and a communication interface of the computer, for example. For example, the CPU reads the program from a program recording medium, such as a program storage apparatus of the computer, and uses, as necessary, the communication interface to operate as each of the processing sections of the apparatuses described above according to the program.

<3.2. Operation Example>

Next, an operation example according to the second example embodiment will be described.

According to the second example embodiment, the signature apparatus 610 (signature section 611) signs data including a predetermined data block replaced with a chameleon hash value, using one or more public keys for changers authorized to change data. The changing apparatus 620 (data changing section 621) receives the signed data and changes a content of the predetermined data block of the signed data, using a private key associated with any of the one or more public keys. The verifying apparatus 630 (verifying section 631) receives the signed data with the changed content of the predetermined data block and verifies the signature using the one or more public keys for the changers.

Relationship with First Example Embodiment

As an example, the signature apparatus 610, the changing apparatus 620, and the verifying apparatus 630 according to the second example embodiment are the signature apparatus 210, the changing apparatus 310, and the verifying apparatus 410 according to the first example embodiment, respectively. In this case, the descriptions of the first example embodiment may also be applicable to the second example embodiment.

Note that the second example embodiment is not limited to this example.

<3.3. Description of Effects>

According to the second example embodiment, it is possible to facilitate management of keys and enable designation of a plurality of changers for data with less computation cost.

4. Other Example Embodiments

Note that the present invention is not limited to the example embodiments described above. It should be understood by those of ordinary skill in the art that the example embodiments described above are merely examples and that various alterations are possible without departing from the scope and the spirit of the present invention.

For example, the kinds of processing described in the Specification may not necessarily be executed in time series in the order described above. For example, the kinds of processing may be executed in an order different from that described above or may be executed in parallel. Some of the kinds of processing may not necessarily be performed, or more kinds of processing may be added.

An apparatus including constituent elements of the signature verification system described in the Specification (e.g., one or more apparatuses (or units) among a plurality of apparatuses (or units) constituting the signature verification system or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention. The example embodiments of the present invention can be described as, but not limited to, the following supplementary notes.

(Supplementary Note 1)

A signature verification system including:

a signature apparatus configured to sign data including a predetermined data block replaced with a chameleon hash value, using one or more public keys for changers authorized to change data;

a changing apparatus configured to receive the signed data, and to change a content of the predetermined data block of the signed data using a private key associated with any of the one or more public keys; and a verifying apparatus configured to receive the signed data with the changed content of the predetermined data block, and to verify the signature using the one or more public keys for the changers.

(Supplementary Note 2)

The signature verification system according to supplementary note 1, wherein the predetermined data block is a part permitted to be changed of the data.

(Supplementary Note 3)

The signature verification system according to supplementary note 2, wherein the data includes the predetermined data block and a data block not permitted to be changed.

(Supplementary Note 4)

The signature verification system according to any one of supplementary notes 1 to 3, wherein the changing apparatus includes one or more changing apparatuses, and the one or more changing apparatuses include one or more respective private keys for the changers associated with the one or more respective public keys.

(Supplementary Note 5)

The signature verification system according to any one of supplementary notes 1 to 4, wherein the predetermined data block is changeable by any of the changing apparatuses including the private keys.

(Supplementary Note 6)

The signature verification system according to any one of supplementary notes 1 to 5, wherein the chameleon hash value is calculated according to a chameleon hash function CH expressed by Expression (3) below by using a message m indicating the data and a random number r,

[Math. 8]

$$CH_{pk_1,pk_2,\dots,pk_n}(m, r) = g^r pk_1^m pk_2^m \dots pk_n^m = $$
$$g^{r'} pk_1^m pk_2^m \dots z_j^{m'} \dots pk_n^m = CH_{pk_1,\dots,pk_j\to z_j,\dots,pk_n}(m \to m', r') \tag{3}$$

where x denotes a private key for a changer, y denotes a public key for the changer, and y=g$^x$ mod p.

(Supplementary Note 7)

The signature verification system according to any one of supplementary notes 1 to 5, wherein the chameleon hash value is calculated according to a chameleon hash function CH expressed by Expression (4) below by using a message m indicating the data and a random number r,

[Math. 9]

$$CH_{pk_1 pk_1', pk_2 pk_2', \dots, pk_n pk_n'}(m, r, s) = $$
$$g^r pk_1^m pk_1'^s \dots pk_n^m pk_n'^s = g^{r'} pk_1^m pk_1'^s \dots pk_j^{m'} pk_j'^{s'} \dots pk_n^m pk_n'^s = $$
$$CH_{pk_1 pk_1',\dots,pk_j pk_j',\dots,pk_n pk_n'}(m \to m', r', s \to s') \tag{4}$$

where x denotes a private key for a changer, y denotes a public key for the changer, and y=g$^x$ mod p.

(Supplementary Note 8)

The signature verification system according to any one of supplementary notes 1 to 5, wherein the chameleon hash value is calculated according to a chameleon hash function CH expressed by Expression (6) below by using a message m indicating the data and a random number r,

[Math. 10]

$$CH_{pk_1,pk_2,\dots,pk_n}(m, r) = g^m pk_1^r pk_2^r \dots pk_n^r = $$
$$g^{m'} pk_1^r pk_2^r \dots pk_j^{r'} \dots pk_n^r = CH_{pk_1,\dots,pk_j\to pk_j',\dots,pk_n}(m', r' \to r') \tag{6}$$

where x denotes a private key for a changer, y denotes a public key for the changer, and y=g$^x$ mod p.

(Supplementary Note 9)

The signature verification system according to any one of supplementary notes 1 to 5, wherein the chameleon hash value is calculated according to a chameleon hash function CH expressed by Expression (7) below by using a message m indicating the data and a random number r,

[Match. 11]

$$CH_{pk_1 pk_1', pk_2 pk_2', \dots, pk_n pk_n'}(m, r, s) = $$
$$g^m pk_1^r pk_1'^s \dots pk_n^r pk_n'^s = g^{m'} pk_1^r pk_1'^s \dots pk_j^{r'} pk_j'^{s'} \dots pk_n^r pk_n'^s = $$
$$CH_{pk_1 pk_1',\dots,pk_j pk_j',\dots,pk_n pk_n'}(m', r \to r', s \to s') \tag{7}$$

where x denotes a private key for a changer, y denotes a public key for the changer, and y=g$^x$ mod p.

(Supplementary Note 10)

A signature verification method including:

a signature step of signing data including a predetermined data block replaced with a chameleon hash value, using one or more public keys for changers authorized to change data;

a changing step of receiving the signed data, and changing a content of the predetermined data block of the signed data using a private key associated with any of the one or more public keys; and a verifying step of receiving the signed data with the changed content of the predetermined data block, and verifying the signature using the one or more public keys for the changers.

(Supplementary Note 11)

A program for causing a computer to execute the signature verification method according to supplementary note 10.

INDUSTRIAL APPLICABILITY

The present invention is preferably applied to a signature verification system using a sanitizable signature possible to designate a plurality of changers.

REFERENCE SIGNS LIST

100 Signature Verification System
210 Signature Apparatus
211 Key Generating Section
212 Data Generating Section
213 Signature Section
214 Data Transmitting Section
310 Changing Apparatus
311 Key Generating Section
312 Data Changing Section
313 Signature Section
314 Data Transmitting Section
410 Verifying Apparatus
411 Verifying Section

What is claimed is:

1. A signature verification system comprising:

a signature apparatus comprising a memory storing instructions and one or more processors configured to execute the instructions to sign data including a predetermined data block using one or more public keys for changers authorized to change data, the predetermined data block is authorized to be changed and is replaced with a chameleon hash value;

one or more changing apparatuses comprising a memory storing instructions and one or more processors configured to execute the instructions to receive the signed data, and to change a content of the predetermined data block of the signed data using a private key associated with any of the one or more public keys; and a verifying apparatus comprising a memory storing instructions and one or more processors configured to execute the instructions to receive the signed data with the changed content of the predetermined data block and to verify the signature using the one or more public keys for the changers, the chameleon hash value is calculated according to a chameleon hash function CH expressed by Expression (3) below by using a message m indicating the data and a random number r,

[Math. 1]

$$CH_{pk_1,pk_2,\ldots,pk_n}(m, r) = g^r\, pk_1^m\, pk_2^m\, \ldots\, pk_n^m = \qquad (3)$$
$$g^{r'}\, pk_1^m\, pk_2^m\, \ldots\, z_j^{m'}\, \ldots\, pk_n^m = CH_{pk_1,\ldots,pk_j \to z_j,\ldots,pk_n}(m \to m', r')$$

where x denotes a private key for a changer, y denotes a public key for the changer, and y=g$^x$ mod p.

2. The signature verification system according to claim 1, wherein the predetermined data block is a part permitted to be changed of the data.

3. The signature verification system according to claim 2, wherein the data includes the predetermined data block and a data block not permitted to be changed.

4. The signature verification system according to claim 1, wherein the one or more changing apparatuses include one or more respective private keys for the changers associated with the one or more respective public keys.

5. The signature verification system according to claim 1, wherein the predetermined data block is changeable by any of the changing apparatuses including the private keys.

6. A signature verification method comprising:

a signature step of signing data including a predetermined data block using one or more public keys for changers authorized to change data, the predetermined data block is authorized to be changed and is replaced with a chameleon hash value;

a changing step of receiving the signed data, and changing a content of the predetermined data block of the signed data using a private key associated with any of the one or more public keys; and a verifying step of receiving the signed data with the changed content of the predetermined data block, and verifying the signature using the one or more public keys for the changers, the chameleon hash value is calculated according to a chameleon hash function CH expressed by Expression (3) below by using a message m indicating the data and a random number r,

[Math. 1]

$$CH_{pk_1,pk_2,\ldots,pk_n}(m, r) = g^r\, pk_1^m\, pk_2^m\, \ldots\, pk_n^m = \qquad (3)$$
$$g^{r'}\, pk_1^m\, pk_2^m\, \ldots\, z_j^{m'}\, \cdots\, pk_n^m = CH_{pk_1,\ldots,pk_j \to z_j,\ldots,pk_n}(m \to m', r')$$

where x denotes a private key for a changer, y denotes a public key for the changer, and y=g$^x$ mod p.

7. A non-transitory computer readable recording medium storing a program for causing a computer to execute the signature verification method according to claim 6.

* * * * *